W. J. HEMPY.
BORING MACHINE.
APPLICATION FILED FEB. 24, 1919.
1,407,031.
Patented Feb. 21, 1922.
2 SHEETS—SHEET 2.
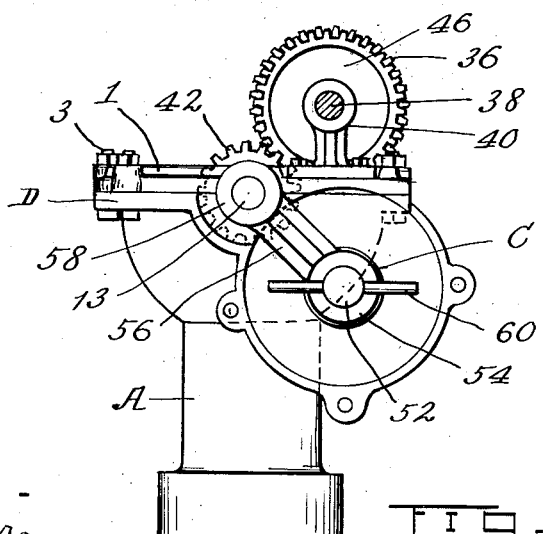
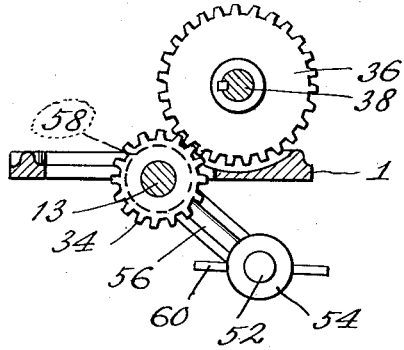
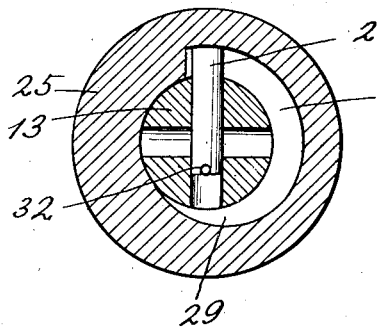
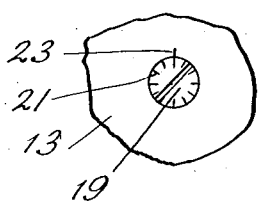
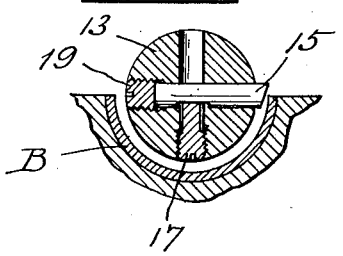
WITNESS:
R C Hamilton
INVENTOR:
Wilbur J. Hempy,
BY
F. G. Fischer,
ATTORNEY.

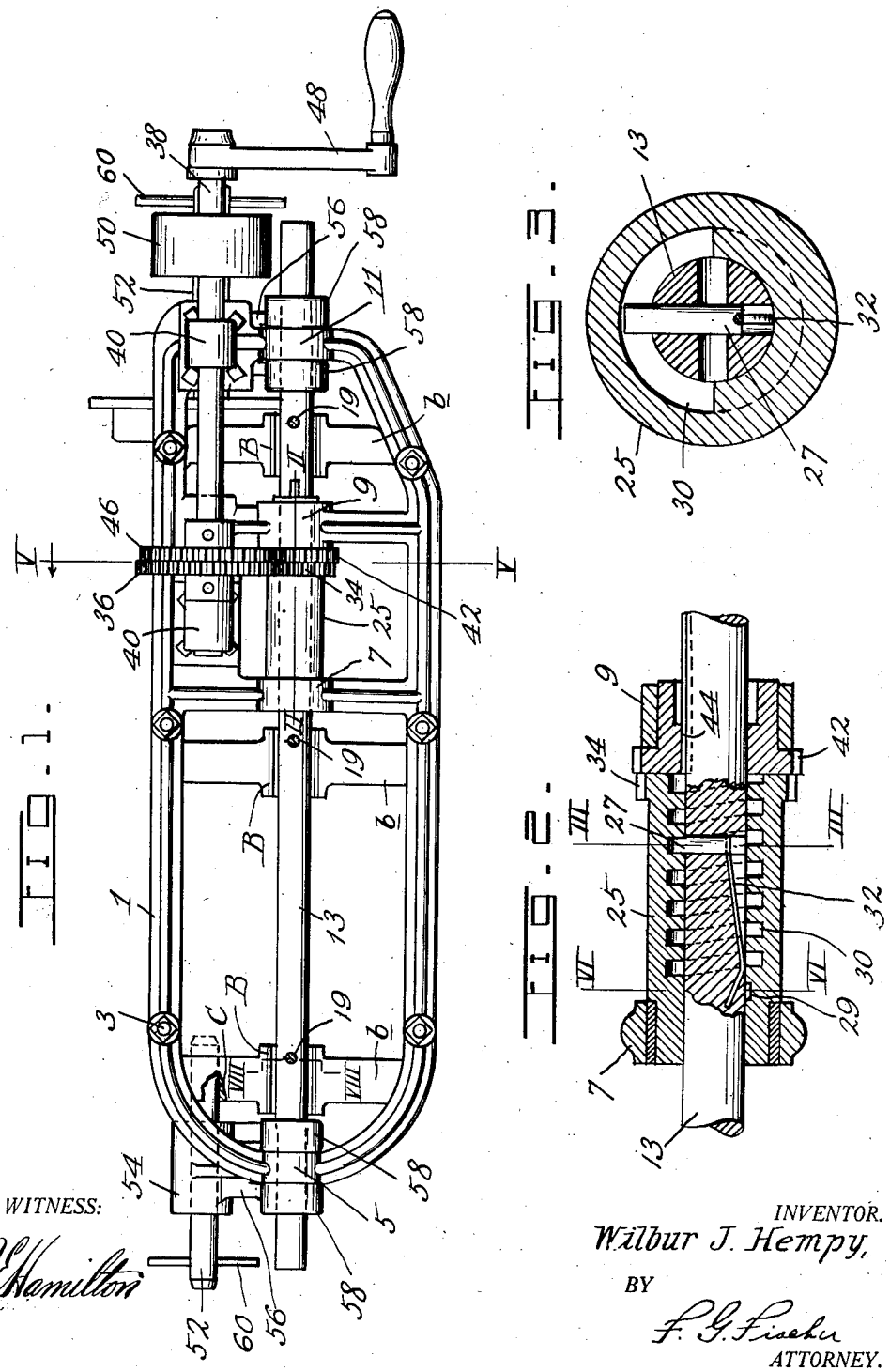

UNITED STATES PATENT OFFICE.

WILBUR J. HEMPY, OF OTTAWA, KANSAS, ASSIGNOR TO HEMPY-COOPER MANUFACTURING COMPANY, A CORPORATION OF MISSOURI.

BORING MACHINE.

1,407,031. Specification of Letters Patent. Patented Feb. 21, 1922.

Application filed February 24, 1919. Serial No. 278,686.

*To all whom it may concern:*

Be it known that I, WILBUR J. HEMPY, a citizen of the United States, residing at Ottawa, in the county of Franklin and State of Kansas, have invented certain new and useful Improvements in Boring Machines, of which the following is a specification.

My invention relates to machines for boring the bearings of engine cylinder blocks and while it may be adapted to different kinds of cylinder blocks it is especially useful in boring the bearings of Ford cylinder blocks and also Fordson tractor cylinder blocks.

The machine is simple in construction and designed to quickly and accurately bore all of the crank shaft bearings of a cylinder block in one operation, and in order that a thorough understanding of its construction and operation may be had, reference will now be made to the accompanying drawings, in which:

Fig. 1 is a plan view of the machine in position upon an inverted cylinder block.

Fig. 2 is a broken, enlarged sectional view on line II of Fig. 1.

Fig. 3 is an enlarged cross sectional view on line III—III of Fig. 2.

Fig. 4 is an end elevation of the machine in position upon the cylinder block, the drive shaft of the boring machine being in cross section.

Fig. 5 is a cross section of the boring machine removed from the cylinder block and taken on line V—V of Fig. 1.

Fig. 6 is an enlarged cross sectional view on line VI—VI of Fig. 2.

Fig. 7 is a fragmentary elevation of part of the boring mandrel and means for adjusting each cutting tool carried by said mandrel.

Fig. 8 is an enlarged cross section on line VIII—VIII of Fig. 1.

A, designates the engine cylinder block provided with three alined babbitt bearings B to receive the usual crank shaft (not shown). Said bearings B are mounted in the customary transverse supports $b$, extending from side to side of the cylinder block A, which latter is also provided at its ends with the usual cam shaft bearings C, which coact in locating my machine in proper position upon the cylinder block A, as will hereinafter appear.

Referring now to the various parts of the machine, 1 designates a frame which is shaped to fit directly upon the flange D surrounding the base of the cylinder block A. Said frame 1 is provided with holes which register with the usual holes in the flange D to receive bolts 3 whereby the frame 1 is firmly secured upon the flange D.

The frame 1 is provided with transverse bearings 5, 7, 9 and 11, in which a boring mandrel 13 is journaled. Said boring mandrel 13 is provided with three cutting tools 15, one for each babbitt bearing B. The cutting tools are spaced apart the distance of the babbitt bearings B and each cutting tool 15 extends transversely through the mandrel 13 and after being adjusted longitudinally to cut the babbitt to the desired depth, it is firmly secured by a lock screw 17 threaded into the mandrel and bearing against the side of the cutting tool 15 as disclosed by Fig. 8.

Longitudinal adjustment of the cutting tool 15 is effected by an adjusting screw 19, threaded into the mandrel 13 and bearing against the rear end of said cutting tool 15. As disclosed by Fig. 7, the outer end of the adjusting screw 19 has a dial 21 to coact with an indicator 23 stamped on the mandrel 13. The foregoing dial 21 and the indicator 23 enable the operator to determine the longitudinal adjustment of the cutting tool 15 without measuring the distance to which the cutting edge projects from the adjacent side of the mandrel 13.

The mandrel 13 is advanced longitudinally to carry the cutting tools 15 from end to end of the bearings B, through the intermediacy of an internally-threaded feed screw or nut 25 and a detent 27. The feed screw 25 is journaled upon the mandrel 13 and the rear end 29 of its thread 30 tapers down to the diameter of the boring mandrel 13 as more clearly disclosed on Fig. 6. Thus when the detent 27 which is yieldably-mounted upon a spring 32 reaches the reduced end of the tapered portion 29 the thread 30 ceases to advance said detent 27 and the same in turn ceases to advance the mandrel 13, hence there is no danger of damaging the machine should the operator inadvertently fail to stop it after the cutting tools 15 have traversed the length of the bearings B.

The feed-nut 25 is provided at one end with spur teeth 34, which are engaged and driven by a master gear 36 fixedly-mounted upon a drive shaft 38 journaled in bearings 40 mounted on the frame 1.

The mandrel 13 is provided with a pinion 42 having a groove-and-feather connection 44 with said mandrel for the purpose of rotating the same and also to permit it to move longitudinally in said pinion 42, which is driven by a master gear 46 fixedly-mounted upon the drive shaft 38 beside the master gear 36.

The gears 34, 42, 36 and 46 are proportioned to drive the feed-nut 25 slightly faster than the mandrel 13, so that the latter will be advanced by the former from end to end of the bearings B, at a relatively low speed. By thus slowly advancing the mandrel 13 with the cutting tools 15, the cut made by each of the latter at each revolution overlaps the preceding cut and thus leaves the bored surfaces of the bearings B, smooth throughout their respective lengths.

The drive shaft 38 is provided at one end with a crank 48 whereby it may be manually operated. It is also provided with a pulley 50, so that it may be power driven where power is available.

52 designates a pair of centering-pins slidably-mounted in bearings 54 at one end of arms 56 provided at their opposite end with bearings 58 swiveled upon the boring mandrel 13. One end of each centering pin 52 is provided with a handle 60, while its opposite end is adapted to fit snugly within the adjacent cam shaft bearing C, so as to aid in properly centering the boring mandrel 13 in proper relation to the bearings B.

In practice the frame 1 is placed upon the inverted cylinder block A in such position as to bring the mandrel 13 into axial alinement with the bearings B, which operation is aided by the centering-pins 52 and the cam shaft bearings C. The frame 1 is then firmly secured in place by the bolts 3. The cutting tools 15 are then adjusted longitudinally to trim out the bearings B, after which the drive shaft 38 is rotated to drive the mandrel 13 and the feed-nut 25 through the intermediacy of the gearing 34, 36, 42 and 46, until said cutting tools 15 travel from end to end of the bearings B.

From the foregoing description it is apparent that I have produced a machine embodying the advantages above-mentioned, and while I have shown and described the preferred form of the invention, I reserve the right to make such changes in the construction, combination, and arrangement of parts as properly fall within the spirit and scope of the claims.

Having thus described my invention, what I claim and desire to secure by Letters Patent, is:

1. In a machine of the character described, means adapted to be secured to a cylinder block, a member arranged to rotate and move longitudinally in said means, a cutting tool carried by said member to bore the crank shaft bearings in the cylinder block, a yieldably-mounted detent carried by said member, and a rotatably internally-threaded member engaging said detent to move the member longitudinally with the cutting tool, the internal thread being tapered at one end to throw the detent out of engagement and stop longitudinal movement of the first-mentioned member.

2. In a machine of the character described, means adapted to be secured to a cylinder block, a member rotatably and slidably mounted in said means, cutting tools carried by said member to bore the bearings in the cylinder block, a detent, a spring yieldably connecting said detent to the member, and a feed-nut engaging the detent and mounted upon the member to move the same longitudinally, the thread of said feed-nut being tapered at one end to throw the detent out of engagement and stop longitudinal movement of the member after it has carried the cutting tools from end to end of the respective bearings.

3. In a machine of the character described, means adapted to be secured to a cylinder block, a member rotatably and slidably mounted in said means, a cutting tool carried by said member to bore the crank shaft bearings in the cylinder block, means for rotating said member, a feed-nut rotatively mounted upon said member and having an internal thread to engage and move said member longitudinally, and means for rotating said feed-nut faster than the member to move the latter longitudinally with the cutting tool.

4. In a machine of the character described, means adapted to be secured to a cylinder block having axially alined bearings, a member rotatably and slidably mounted in said means and held thereby in axial alinement with said bearings, a cutting tool carried by said member to bore the bearings in the cylinder block, a gear wheel having a groove-and-feather connection with said member, means for driving said gear wheel, a feed-nut operably-engaging the member, and gearing for driving said feed-screw at a different speed from the member to move the same longitudinally with the cutting tool.

5. In a machine of the character described, means adapted to be secured to a cylinder block having axially alined bearings, a mandrel mounted to rotate and travel longitudinally in said means, cutting tools carried by said mandrel and spaced apart to engage and bore the bearings in the cylinder block, a gear wheel to rotate the mandrel, a second gear wheel to drive the first one, a drive shaft upon which said second gear wheel is mounted, a feed-nut operably-engaging the mandrel to cause the same to carry the cutting tools from end to end of the bearings, spur teeth on said feed-nut, and a spur gear mounted on the drive shaft and engaging the spur teeth on the feed-nut to drive the latter faster than the mandrel.

6. In a machine of the character described, means adapted to be secured to a cylinder block having cam shaft bearings at each end, centering-pins adapted to slidably enter the cam-shaft bearings of the cylinder block and aid in properly positioning said means upon said cylinder block, a member mounted to rotate and travel longitudinally in said means, a cutting tool carried by said member to bore the main shaft bearings in the cylinder block, and means for moving the member longitudinally with the cutting tool.

7. In a machine of the character described, means adapted to be secured to a cylinder block having cam shaft bearings at each end, centering-pins adapted to slidably enter the cam-shaft bearings of the cylinder block and aid in properly positioning said means upon said cylinder block, handles to said centering-pins, a member mounted to rotate and travel longitudinally in said means, arms operably mounted upon said member and in which the centering-pins are slidably-mounted, cutting tools carried by said member to bore the main shaft bearings in the cylinder block, and means for moving the member longitudinally to cause it to carry the cutting tools from end to end of said main shaft bearings.

8. In a machine of the character described, means adapted to be supported by an inverted cylinder block having a plurality of crank shaft bearings spaced apart, a member mounted to rotate and move longitudinally in said means, mechanism to actuate said member, and tools carried by said member and spaced apart to engage and trim the crank shaft bearings as said member rotates and moves longitudinally.

9. In a machine of the character described, a portable frame shaped to fit upon the margin of an inverted cylinder block having crank shaft bearings, a bar mounted to rotate and move longitudinally in said frame and be supported thereby in axial alinement with the crank shaft bearings, and tools projecting from the periphery of said bar to trim the crank shaft bearings as said bar rotates and moves longitudinally.

10. In a machine of the character described, a portable frame adapted to fit upon the margin of an inverted cylinder block having crank shaft bearings and cam shaft bearings, a mandrel mounted to rotate and move longitudinally in said frame, mechanism to actuate said mandrel, tools carried by said mandrel and spaced apart to engage and trim the crank shaft bearings as said mandrel rotates and moves longitudinally, and means for engaging the cam shaft bearings to assist in positioning and holding the frame upon the cylinder block.

11. In a machine of the character described, a mandrel, supporting means adapted to be supported by a cylinder block and hold the mandrel in axial alinement with the babbitted crank shaft bearings of said cylinder block, cutting tools spaced apart on the mandrel to trim the babbitted bearings, and mechanism for rotating and moving said mandrel longitudinally.

12. In a boring tool for crank case bearings, the combination with a boring bar, of bearings for supporting the opposite ends of said bar, arms extending from said boring bar bearings, and means carried by said arms for engaging the cam shaft bearings in the crank case for locating said boring bar bearings a predetermined distance from the axis of the cam shaft bearings.

13. In a boring tool for crank case bearings, the combination with a boring bar of a length to extend beyond the ends of the crank case, of bearings for said bar at opposite ends of the crank case, arms extending from said boring bar bearings, and a shaft carried by said arms engaging the cam shaft bearings in the crank case for locating said boring bar bearings a predetermined distance from the axis of the cam shaft bearings.

14. In a boring tool for crank case bearings, the combination with a boring bar of a length to extend beyond the crank case, of bearings for said bar at opposite ends of the crank case, arms extending oppositely from said boring bar bearings, a shaft carried by said arms at one side of the boring bar bearings engageable with the cam shaft bearings in the crank case for locating said boring bar bearings a predetermined distance from the axis of the cam shaft bearings, and means carried by said arms at the opposite side of the boring bar bearings engaging a machined face of the crank case to further position the boring bar bearings.

15. In a boring tool for crank case bearings, the combination with a boring bar, of bearings for supporting the opposite ends of said bar, means carried by said bearings having positioning engagement with a machined face of the crank case, arms extending from said boring bar bearings, and means carried by said arms for engaging the cam shaft bearings in the crank case, for locating said boring bar bearings a predetermined distance from the axis of the cam shaft bearings.

In testimony whereof I affix my signature in the presence of two witnesses.

WILBUR J. HEMPY.

Witnesses:
 H. B. EARLY,
 E. MINCHANT.